United States Patent
Palla et al.

(10) Patent No.: US 9,560,802 B1
(45) Date of Patent: Feb. 7, 2017

(54) TAILINGS PLUG REDUCTION

(71) Applicant: Deere & Company, Moline, IL (US)

(72) Inventors: Bhanu Kiran Reddy Palla, Bettendorf, IA (US); John M. Hageman, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/799,053

(22) Filed: Jul. 14, 2015

(51) Int. Cl.
G06F 7/70 (2006.01)
A01D 41/127 (2006.01)
A01F 12/18 (2006.01)

(52) U.S. Cl.
CPC .......... *A01D 41/127* (2013.01); *A01F 12/18* (2013.01); *A01F 2012/188* (2013.01)

(58) Field of Classification Search
CPC ........... A01D 75/18; A01F 12/00; A01F 12/16
USPC .............. 701/50; 460/1, 4–6, 66, 69, 85, 93; 340/684
See application file for complete search history.

(56) References Cited

U.S. PATENT DOCUMENTS

| 7,713,115 | B2 * | 5/2010 | Behnke | A01D 41/1276 340/684 |
| 8,282,453 | B1 * | 10/2012 | Hillen | A01D 41/1276 340/684 |
| 2004/0266503 | A1 * | 12/2004 | Schmidt | A01F 12/52 460/114 |
| 2005/0186997 | A1 * | 8/2005 | Ho | A01D 41/127 460/1 |

FOREIGN PATENT DOCUMENTS

| JP | 2008199995 A | 9/2008 |
| JP | 2009291086 A | 12/2009 |

* cited by examiner

*Primary Examiner* — Thomas G Black
*Assistant Examiner* — Luke Huynh
(74) *Attorney, Agent, or Firm* — Joseph R. Kelly; Kelly, Holt & Christenson, PLLC

(57) ABSTRACT

A sensor signal is received, and is indicative of a sensed parameter. A metric is generated that indicates a likelihood of a tailings elevator plug, based upon the sensed parameter. A controller determines whether adjustments to controllable mechanisms are to be made, based upon the metric, in order to avoid a tailings elevator plug and, if so, automatically makes the adjustments.

19 Claims, 9 Drawing Sheets

TAILINGS PLUG REDUCTION

FIELD OF THE DESCRIPTION

The present description relates to controlling agricultural equipment. More specifically, the present description relates to controlling agricultural equipment to reduce plugging of a tailings elevator mechanism.

BACKGROUND

There is a wide variety of different types of agricultural equipment. Some such equipment, for instance, includes a mobile machine that harvests crops. An example of such a mobile machine is a combine. Many combines have a tailings elevator mechanism (or tailings return elevator) that returns material being processed by the combine for additional processing (e.g., for additional threshing). During operation of the combine there is a risk that the tailings elevator will become plugged. When that happens, the operator often needs to stop the machine in order to manually unplug the elevator. This increases machine downtime, and thus reduces harvesting efficiency. It can also reduce the life of machine components, such as the tailings elevator slip clutch, or other components.

It can also be difficult for an operator to anticipate when the tailings elevator will become plugged. It often becomes plugged when the volume of tailings being moved through the elevator meets or exceeds the capacity of the elevator. The increase in tailings volume can be caused by changes in various settings on the machine, by operating the machine so that the feed rate is increased, or by a variety of changes in field conditions. For instance, if the machine encounters an area of heavy or dense weeds in the field, this can cause the tailings volume to increase at a rapid rate. An operator may be unable to react quickly enough to prevent the tailings elevator from plugging.

The discussion above is merely provided for general background information and is not intended to be used as an aid in determining the scope of the claimed subject matter.

SUMMARY

A sensor signal is received, and is indicative of a sensed parameter. A metric is generated that indicates a likelihood of a tailings elevator plug, based upon the sensed parameter. A controller determines whether adjustments to controllable mechanisms are to be made, based upon the metric, in order to avoid a tailings elevator plug and, if so, automatically makes the adjustments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
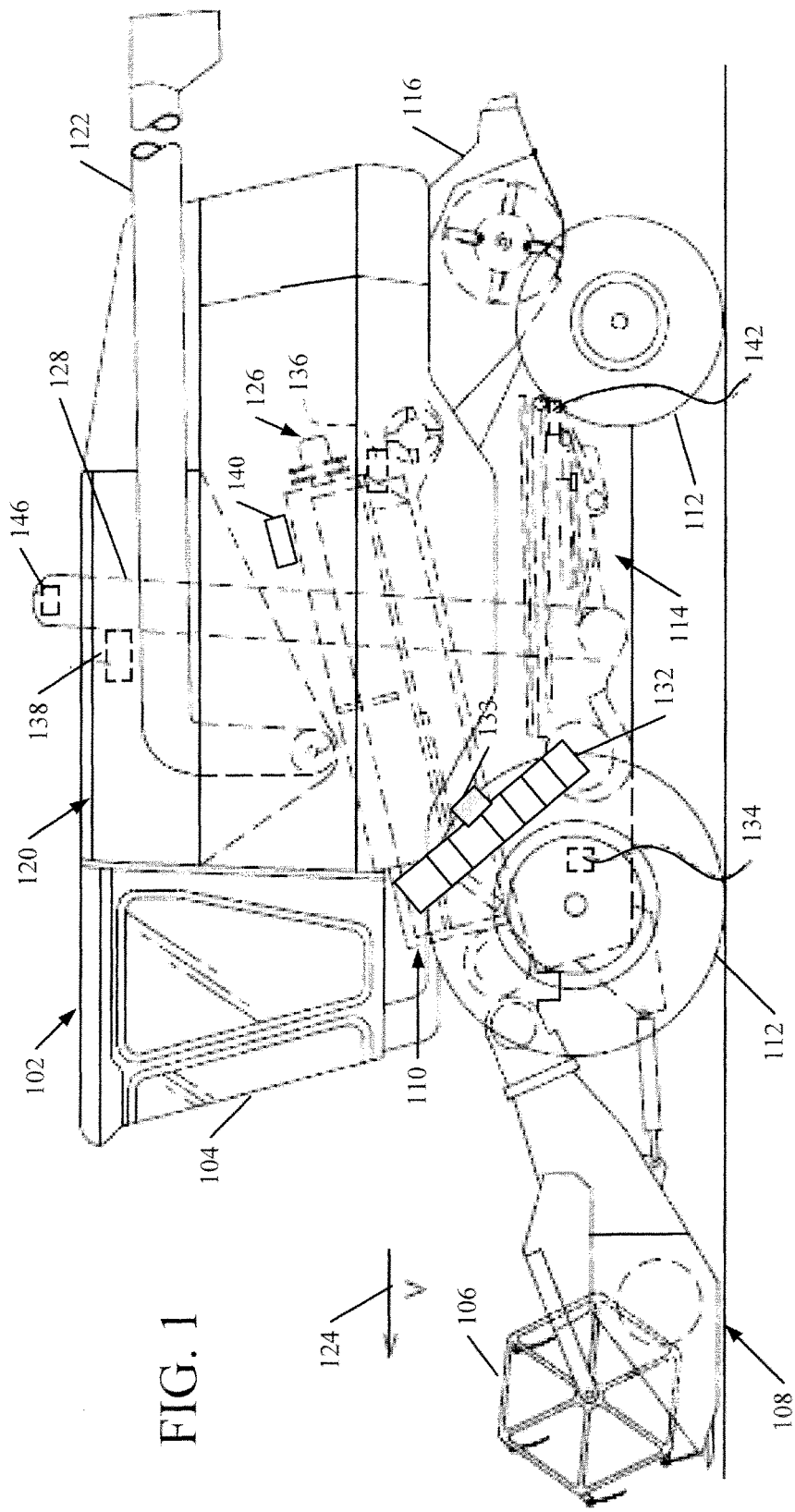
FIG. 1 is a partial pictorial, partial block diagram, of a harvesting machine (e.g., a combine).

FIG. 1 is a partial pictorial, partial block diagram, of a mobile machine 102 which, in the present example, is a combine. It can be seen in FIG. 1 that combine 102 illustratively includes an operator compartment 104, a header 106, a cutter generally indicated at 108, a thresher generally indicated at 110, a set of ground engaging wheels 112, a separator 126, a spreader 116, a clean grain tank indicated by arrow 120, a spout 122 and a tailings elevator 132. In operation, combine 102 illustratively travels in the direction generally indicated by arrow 124. Header 106 engages the product being harvested and gathers it toward cutter 108. After it is cut, it is moved toward thresher 110 where it is threshed, and then moved toward separator 126. The grain falls to cleaning shoe 114 and the clean grain is moved by clean grain elevator 128 into clean grain tank 120. Tailings can be passed back to thresher 110, using tailings elevator 132, where they are re-threshed. Alternatively, the tailings can also be passed to a separate re-threshing mechanism (also using a tailings elevator or another transport mechanism) where they can be re-threshed as well. Material other than grain (such as stalks, husks, etc.) can be chopped and removed from machine 102 by spreader 116.

The tailings elevator 132 can take a variety of different forms. For instance, it can include an auger that rotates to move the tailings to the thresher 110 or re-thresher. It can also include a set of chain-driven paddles that lift the tailings to the desired location as well. These and other arrangements of the tailings elevator 132 are contemplated herein.

FIG. 1 also shows that, in one example, combine 102 can include a tailings volume sensor 133, ground speed sensor 134, one or more separator loss sensors 136, a clean grain camera 138, a tailings camera 140 and one or more cleaning shoe loss sensors 142. Ground speed sensor 134 illustratively senses the travel speed of combine 102 over the ground. This can be done by sensing the speed of rotation of the wheels, the drive shaft, the axle, or other components. The travel speed can also be sensed by a positioning system, such as a global position system (GPS), a dead reckoning system, a LORAN system, or a wide variety of other systems or sensors that provide an indication of travel speed.

Cleaning shoe loss sensors 142 illustratively provide an output signal indicative of the quantity of grain loss by both the right and left cleaning shoes. In one example, sensors 142 are strike sensors which count grain strikes per unit of time (or per unit of distance traveled) to provide an indication of the cleaning shoe grain loss. The strike sensors for the right and left cleaning shoes can provide individual signals or a combined or aggregate signal. It will be noted that sensors 142 can comprise only a single sensor as well, instead of separate sensors for each shoe.

In one example, the tailings elevator 132 has a tailings volume sensor 133 disposed thereon. As is described below, tailings volume sensor 133 can take a wide variety of different forms. It illustratively senses a parameter that is indicative of whether the tailings elevator 132 is about to become plugged. Different examples of tailing volume sensors 133 are also discussed in greater detail below.

Separator loss sensors 136 provide a signal indicative of grain loss in the left and right separators 126. The sensors associated with the left and right separators 126 can provide separate grain loss signals, or a combined or aggregate signal. This can be done using a wide variety of different types of sensors as well. It will be noted that separator loss sensors 136 may also comprise only a single sensor, instead of separate left and right sensors.

Tailings camera 140 illustratively generates a video image of the tailings that are being passed back to the thresher (or a re-threshing mechanism) for re-threshing. As is described below, it can be used as tailings volume sensor 133 or in conjunction with another sensor, etc. The tailings camera 140 can be located near separator 126, in the tailings elevator 132, at the input end of the tailings elevator 132, at its output end, or in a different location.

Clean grain camera 138 illustratively provides a video image indicative of the quality of the grain being deposited in clean grain tank 130. Either or both of cameras 138 and 140 can provide the images to a video analysis system that can analyze the video images to generate various different metrics. For instance, clean grain camera 138 can provide its signal to a video analysis system that outputs an indication of a quantity of cracked grain, whole grain, etc., that is entering the clean grain tank. Tailings camera 140 can illustratively provide its video image signal to a video analysis system that identifies a tailings volume of the tailings, or a quality of the tailings. All of these are described for the sake of example only.

Yield monitor 146 can be a sensor that senses yield. In one example, it can sense mass flow through elevator 128. It can provide an output signal indicative of this, to indicate the particular yield. This can be measured in bushels per hour, bushels per hectare, tons per hour or in other units. In one example, for instance, the yield monitor 146 includes a mass flow sensor that has a strain gauge deployed on a strike plate. As the grain entering the clean grain tank strikes the plate, the strain gauge provides a sensor signal indicative of mass flow through clean grain elevator 128. Again, this is described for the sake of example only.

Figure 2:
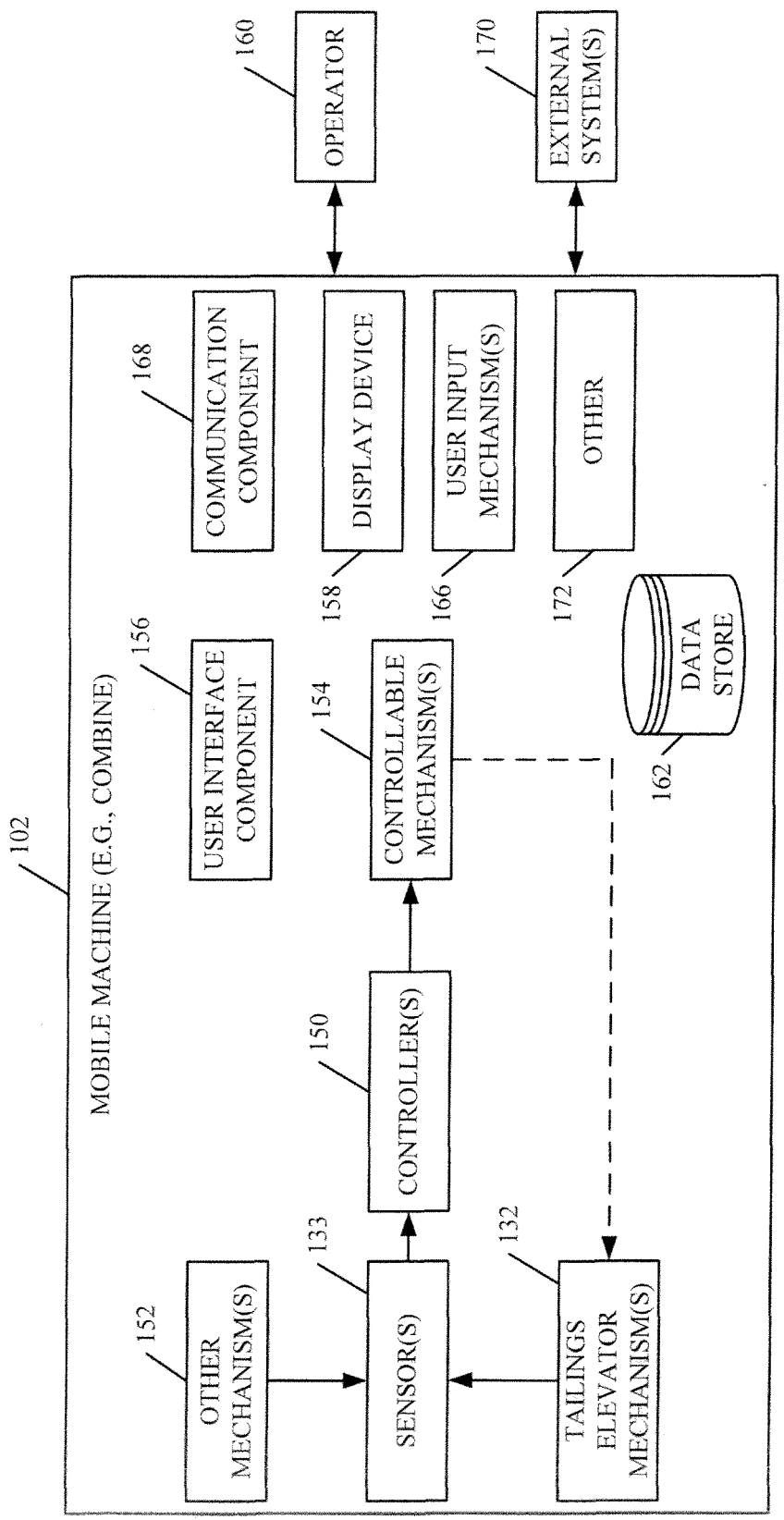
FIG. 2 is a block diagram of one example of components of the mobile machine that are used to detect tailings volume and control controllable mechanisms in order to avoid a tailings elevator plug.

Similar items to those shown in FIG. 1 are similarly numbered in FIG. 2. FIG. 2 shows that mobile machine 102 can include a control system that has one or more controllers or processors 150 that receive sensor inputs from a variety of sensors. In the example shown in FIG. 2, controller 150 is shown receiving an input from tailings volume sensor 133. Sensor 133 can be a sensor that directly senses a parameter or characteristic of tailings elevator mechanisms 132, or that senses a parameter or characteristic of other mechanisms 152 that can provide an indication of tailings volume in the tailings elevator. Mobile machine 102 shows that controller 150 illustratively provides control outputs to controllable mechanisms 154 that can be adjusted to have an impact on the volume of tailings in tailings elevator 132. For instance, and as is described in greater detail below, the controllable mechanisms can be the sieves, the chaffer, the fan speed, etc.

FIG. 2 also shows that mobile machine 102 can include a user interface component 156 that generates user interfaces (such as interface displays) on display device 158. The user interfaces can generate outputs, such as displays, other visual outputs, audio outputs, haptic outputs, etc. The user interfaces can include user input mechanisms that can be actuated by an operator 160 to control and manipulate mobile machine 102. Mobile machine 102 can also include a local data store 162 for storing a variety of different kinds of data, a host of other user input mechanisms 166, which can include a steering wheel, switches, levers, pedals, a speech recognition system for receiving voice inputs, among a wide variety of other input mechanisms. In addition, mobile machine 102 can include a communication component 168 which can communicate with external systems 170. Communication component 168 can include, for instance, a network communication component that communicates with external systems 170 over a network (such as the Internet). It can include a cellular communication system, a messaging system, or a wide variety of other communication components, some of which are described in more detail below. In addition, mobile machine 102 can include a wide variety of other items 172.

Figure 3:
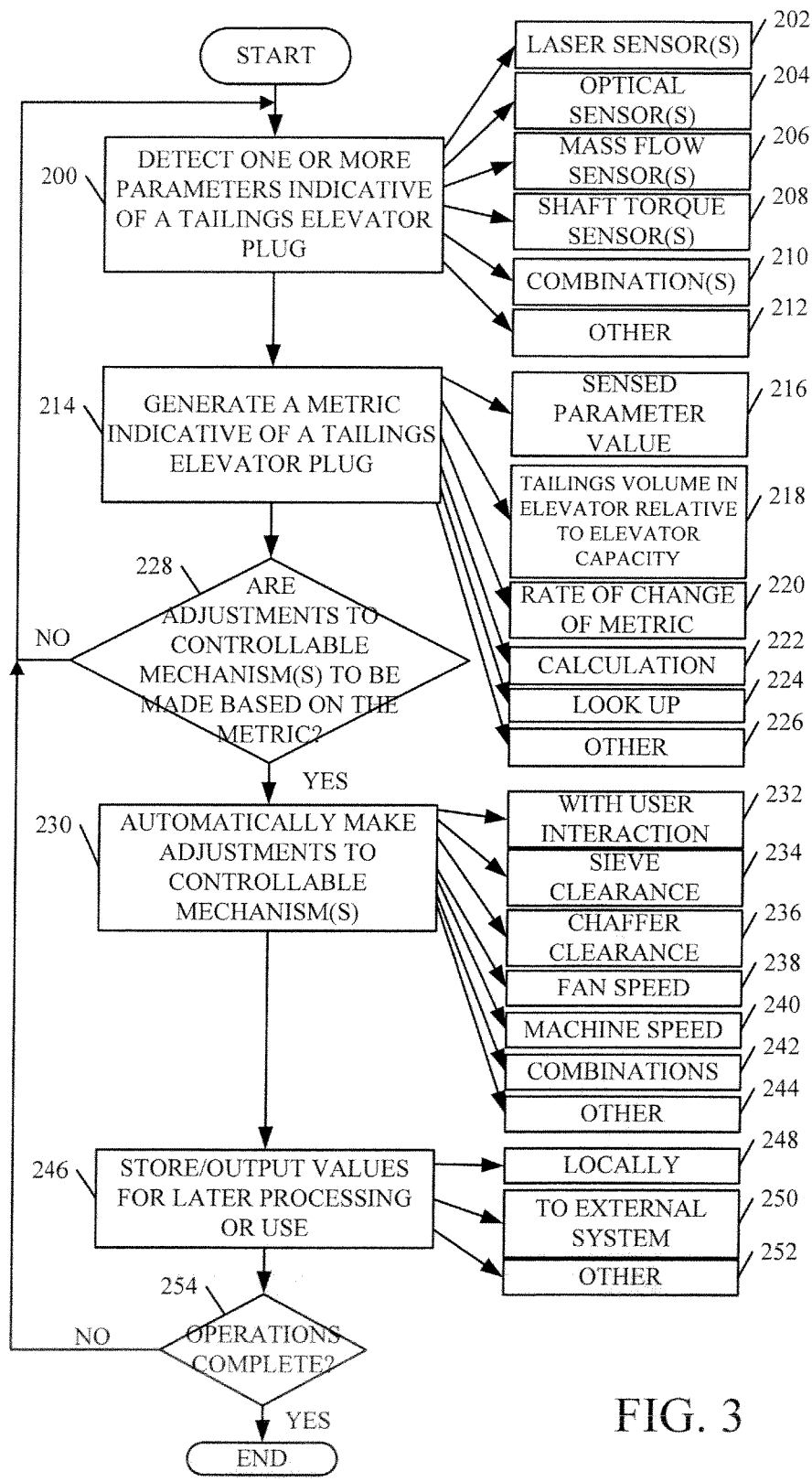
FIG. 3 is a flow diagram illustrating one example of the operation of the mobile machine in sensing tailings volume and controlling the controllable mechanisms to avoid plugging the tailings elevator.

FIG. 3 is a flow diagram illustrating one example of the operation of mobile machine 102 in detecting tailings volume in tailings elevator 132, and making adjustments to controllable mechanisms 154 based upon the sensed tailings volume. One or more sensors 133 first detect one or more parameters that are indicative of whether the tailings elevator 132 is about to plug. This is indicated by block 200 in FIG. 3. The sensors can take a wide variety of different forms. For instance, they can include one or more laser sensors 202 that sense the height of tailings on the auger blades, or paddles, that move the tailings in tailings elevator 132. They can include optical sensors 204 (such as the tailings camera 140) that provide an optical image that can be analyzed to identify tailings volume. They can include one or more mass flow sensors 206 that sense the mass flow of tailings through tailings elevator 132. They can also include a shaft torque sensor 208 that senses a torque on the shaft that turns the tailing elevator 132 to move the tailings. In addition, sensors 133 can be a combination 210 of the sensors described above, or other sensors 212.

One or more sensor signals are provided from sensor(s) 133 to controller 150. It will be appreciated that the sensor signals can be conditioned (such as filtered, compensated, linearized, amplified, etc.) before they are provided to controller 150. Controller 150 then generates a metric indicative of whether the tailings elevator 132 is going to plug, based upon the sensor signal(s) received. This is indicated by block 214. The metric can be the sensed parameter value, itself, as indicated by block 216. It can also be a tailings volume metric that identifies the tailings volume in the elevator, relative to the elevator capacity. For instance, the metric can be a percent of the total elevator volume capacity that the current tailings volume is occupying. This is indicated by block 218. The controller 150 can also illustratively detect or calculate the rate of change of that metric. For instance, if the tailings volume is currently at an acceptable level, but it is increasing rapidly, the rate of change may be calculated and used to determine whether to make adjustments to controllable mechanisms 154, even before the tailings volume becomes unacceptable. Determining the rate of change of the metric is indicated by block 220 in FIG. 3. The metric can be determined by performing a calculation 222, or by looking up the metric value in a lookup table, based upon the value of the sensor signal, as indicated by block 224. The metric can be determined in a wide variety of other ways as well, and this is indicated by block 226.

Controller 150 then determines whether any adjustments to the controllable mechanisms 154 are to be made based upon the metric that it has generated. This is indicated by block 228. If not, processing reverts to block 200 where controller 150 continues to process the sensor signal provided by sensors 133. However, if adjustments are to be made, processing continues at block 230, where controller 150 identifies the adjustments to be made to controllable mechanisms 154, and provides control signals to controllable mechanisms 154 to automatically control them in order to adjust the tailings volume sensed in tailings elevator 132. By automatically, it is meant that the changes are made without any additional substantive user input, except, perhaps to affirm or validate that the change should be made. The changes can be made in a fully automated way as well, in which case not even a user validation is needed.

It will be noted that, in one example, controller 150 controls user interface component 156 to generate a user interface display where operator 160 can affirm that the adjustments are to be made. Generating the adjustments with user interaction or validation is indicated by block 232.

The adjustable mechanisms 154 can take a wide variety of forms. For instance, the adjustments can be to the sieve so that the sieve clearance is adjusted to modify the tailings volume in elevator 132. This is indicated by block 234. The adjustments can be made to the chaffer clearance as indicated by block 236, to the fan speed of the fan in the separator, as indicated by block 238, or to the machine speed of mobile machine 102, as indicated by block 240. Adjustments can also be made to a combination of different controllable mechanisms 154, as indicated by block 242. The particular controllable mechanisms 154 that are adjusted, or the combination of them, may vary dynamically based upon the generated metric, or the rate of change of that metric, or both. The adjustments can be made in other ways as well, and this is indicated by block 244.

In one example, controller 150 also stores or outputs the values of the adjustment, along with the value of the metric and the rate of change of the metric, and the value of the sensor signal, for later processing or use. This is indicated by block 246. For instance, that information can be stored locally on data store 162, as indicated by block 248. It can be stored, analyzed, or otherwise processed at external systems 170, as indicated by block 250. It can be stored or output in other ways as well, and this indicated by block 252.

As long as mobile machine 102 is performing the harvesting operation, this processing continues at block 200 where the sensor signals from sensors 133 are again detected and adjustments can be made based upon whether the tailings elevator 132 is about to plug. This is indicated by block 254 in FIG. 3.

Figure 4:
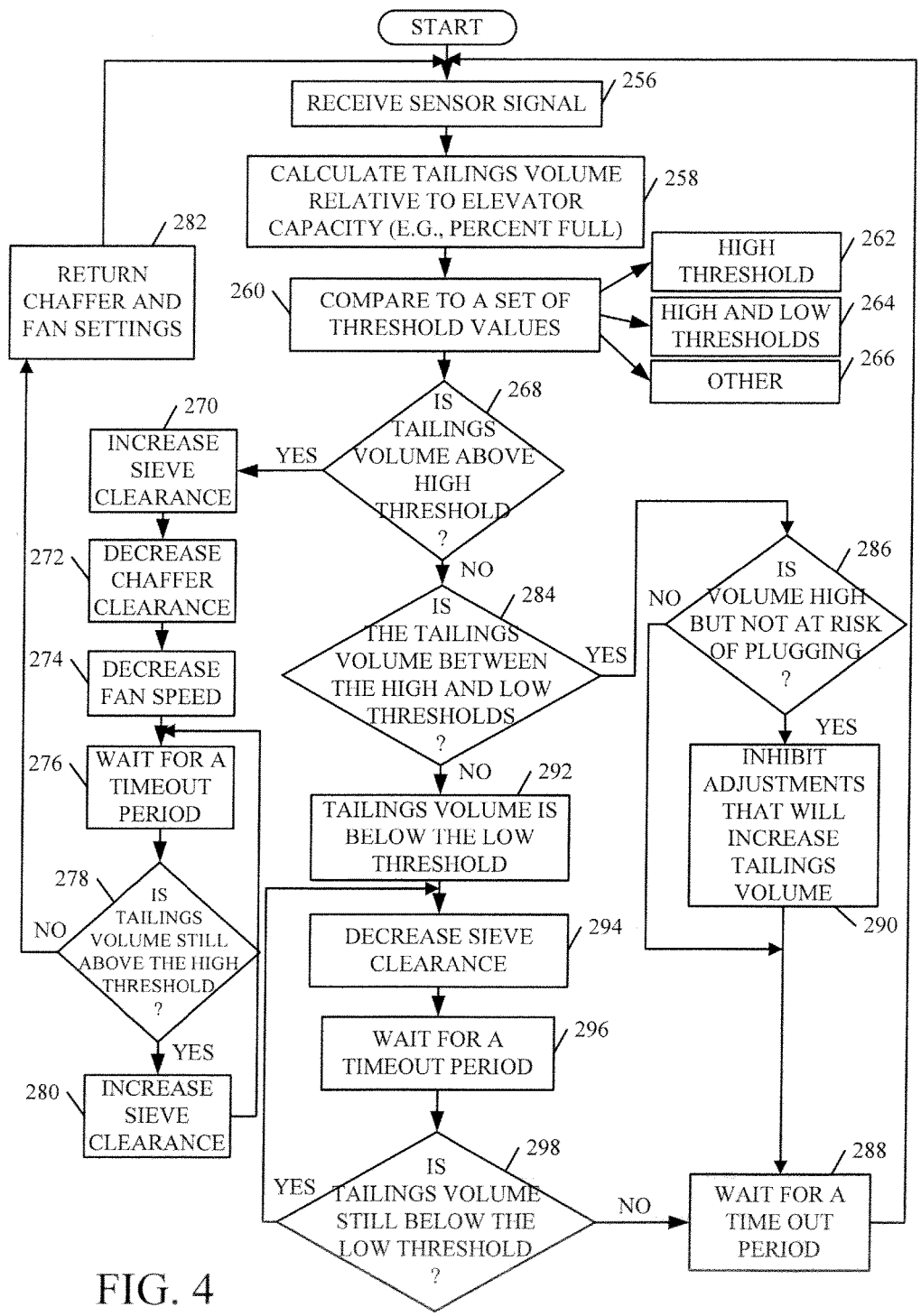
FIG. 4 is a more detailed flow diagram illustrating a more detailed example of the operation of the mobile machine in making adjustments to avoid plugging the tailings elevator.

FIG. 4 is a more detailed flow diagram illustrating one example of the operation of mobile machine 102 in controlling controllable mechanisms 154 based upon the sensed parameter, that is sensed relative to tailings elevator 132. Again, in FIG. 4, controller 150 first receives the sensor signal or signals from sensor(s) 133. This is indicated by block 256. In the example described with respect to FIG. 4, controller 150 then calculates an estimate of the tailings volume in the tailings elevator 132, relative to the volume capacity in tailings elevator 132. For instance, it can calculate the tailings volume as a percent of the total capacity (or the percent full). This is indicated by block 258.

Controller 150 then illustratively compares the calculated tailings volume to one or more threshold values. This is indicated by block 260. For instance, it can compare the detected tailings volume to a high threshold value as indicated by block 262, to high and low threshold values as indicated by block 264, or to a different set of threshold values, as indicated by block 266.

The remainder of the description of FIG. 4 describes an example in which both a high threshold value and a low threshold value are used, but this is only one example. Controller 150 determines whether the calculated tailings volume is above the high threshold value. This is indicated by block 268. If so, this indicates that tailings elevator 132 is likely to plug. Controller 150 thus performs a set of adjustments on controllable mechanisms 154. In the example shown in FIG. 4, controller 150 first increases the sieve clearance, as indicated by block 270. In one example, for instance, it can increase the sieve clearance by 3 mm or by a different amount. It can also illustratively decrease the chaffer clearance as indicated by 272. In addition, it can decrease the fan speed of the separator fan as indicated by block 274. All of these adjustments will have the effect of decreasing the tailings volume in tailings elevator 132. Controller 150 then illustratively waits for a given timeout period, as indicated by block 276. For instance, controller 150 may wait for a time period of 10-30 seconds, or for a different time period. It then accesses the sensor signal from sensor 133 and determines again whether the tailings volume is still above the high threshold. This is indicated by block 278. If so, controller 150 again increases the sieve clearance as indicated by block 280. For instance, it can increase the sieve clearance by another 3 mm, or by a different amount. Processing then reverts to block 276 where controller 150 waits for another timeout period to determine whether the tailings volume has fallen below the high threshold value.

If, at block 278, controller 150 determines that the tailings volume has fallen below the high threshold value, then it illustratively adjusts the chaffer and fan speed again to return them to their original settings (the settings just prior to the last adjustment). This is indicated by block 282. Processing then again reverts to block 256 where controller 150 again monitors sensor signal(s) from sensor(s) 133.

If, at block 268, controller 150 determines that the tailings volume is not above the high threshold value, then, if a low threshold value is also used, controller 150 determines whether the tailings volume is between the high and low threshold values. This is indicated by block 284. If so, then it is determined that the tailings volume is at an acceptable value. However, it may be at the high end of the acceptable level or at the low end of the acceptable level or in the middle. Thus, in one example, controller 150 can determine how close the tailings volume is to the threshold. For instance, controller 150 can determine whether the volume is high, but that elevator 132 is not at risk of plugging. This may correspond to the tailings volume being just slightly below the high threshold value, for instance. Making this determination is indicated by block 286 in FIG. 4. If, at block 286, it is determined that the tailings volume is not close to the high threshold value then controller 150 simply waits for a timeout period and processing again returns to block 256. Waiting for the timeout period is indicated by block 288 in FIG. 4.

If, at block 286, controller 150 determines that the tailings volume is high, or relatively close to the high threshold value (although it is still below it), then controller 150 can inhibit other adjustments that will increase the tailings volume. This is indicated by block 290. For instance, it may be that controller 150, or other controllers on mobile machine 102, are performing adjustments to various mechanisms on mobile machine 102 in order to meet various performance criteria or other operational criteria. Some of those adjustments, if tailings volume is not considered, may undesirably increase the tailings volume in elevator 132. Therefore, in the example shown in FIG. 4, when the tailings volume is below, but close to, the high threshold value, controller 150 inhibits such other adjustments so that they do not increase the tailings volume to a level where a plug in elevator 132 is likely. Once this is done, processing again moves to block 288 and 256.

If, at block 284, controller 150 determines that the tailings volume is not between the high and low thresholds, that means that the tailings volume is below the low threshold. This is indicated by block 292 in FIG. 4. Having a low tailings volume in elevator 132 can mean that the sieve clearance is too large. This can result in unwanted material (e.g., material other than grain) entering the clean grain tank. Therefore, in the example shown in FIG. 4, when the tailings volume is below a low threshold value, controller 150 controls the sieve to decrease the sieve clearance. This is indicated by block 294. It then illustratively waits for a timeout period as indicated by block 296 and determines whether the tailings volume is still below the low threshold. This is indicated by block 298. If so, it decreases the sieve clearance again at block 294 and continues this operation until the tailings volume increases to a more acceptable level. At that point, processing again reverts to blocks 288 and 256.

Figure 5:
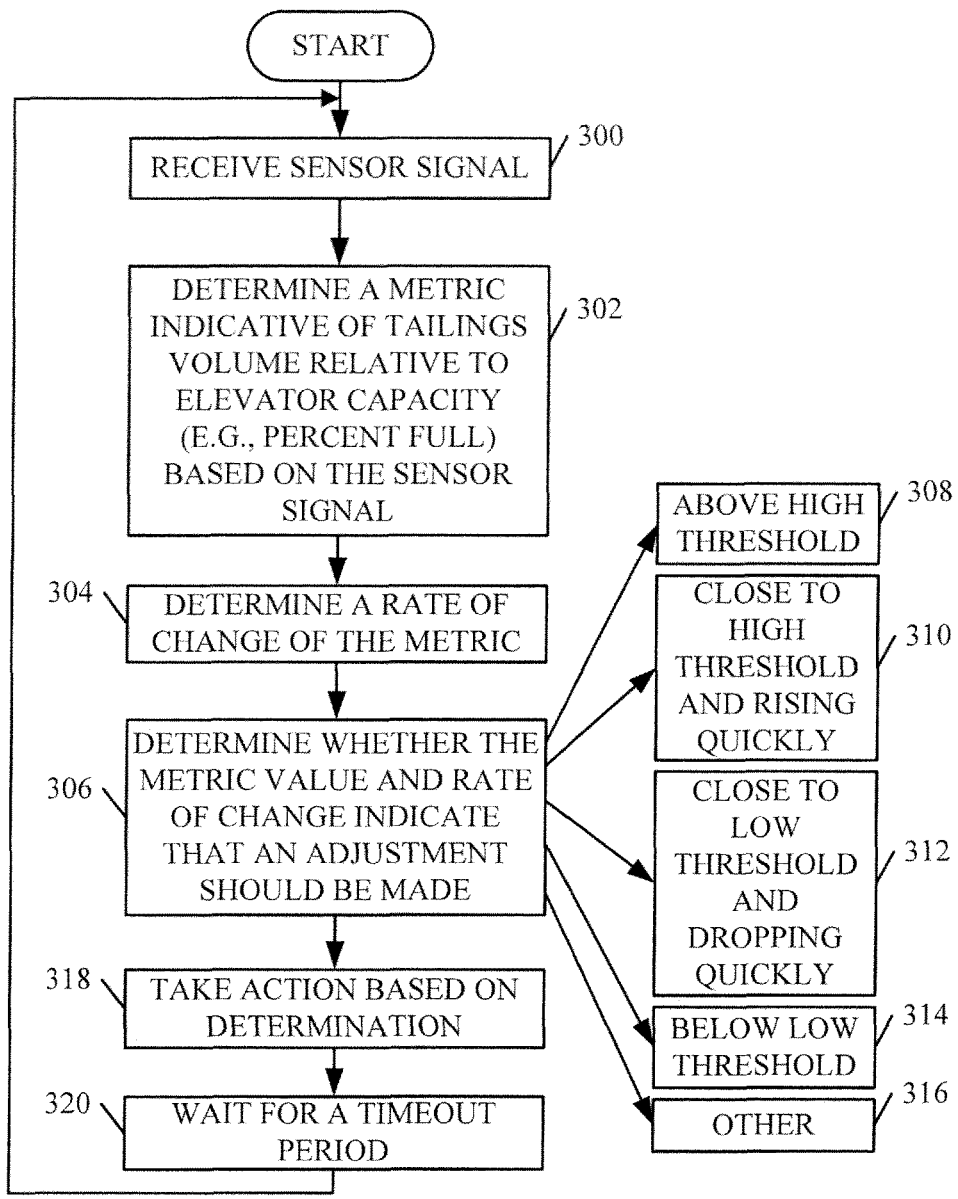
FIG. 5 is a flow diagram illustrating another example of the operation of the mobile machine in using both a metric indicative of tailings volume and a rate of change of that metric.

FIG. 5 is a flow diagram illustrating another example of the operation of mobile machine 102. In FIG. 5, mobile machine 102 considers not only the tailings volume in elevator 132, but also the rate of change of that volume. For instance, field conditions may change relatively rapidly so that the tailings volume increases or decreases rapidly. It may be that the operator 160 cannot react quickly enough to make adjustments in order to accommodate this. Thus, in the example shown in FIG. 5, mobile machine 102 considers the rate of change of the tailings volume as well.

Controller 150 first receives the sensor signal(s) from the one or more sensors 133. This is indicated by block 300 in FIG. 5. It then determines a metric indicative of the tailings volume relative to elevator capacity (e.g., the percent full) based on the sensor signal(s). This is indicated by block 302. Controller 150 then also determines a rate of change of that metric, over time. This is indicated by block 304.

Controller 150 then determines whether the metric value and the rate of change indicate that an adjustment should be made to controllable mechanisms 154. This is indicated by block 306. This can be done in a wide variety of different ways. For instance, if the metric value is simply above a high threshold value, this may indicate to controller 150 that adjustments need to be made (such as those described with respect to FIG. 4). This is indicated by block 308.

In addition, if the metric is below the high threshold value, but is relatively close, and if the rate of change value indicates that it is increasing quickly, then controller 150 can determine that the metric value is likely to cross the high threshold value in the near future, and it can make adjustments to controllable mechanisms 154 to remedy that. This scenario is indicated by block 310 in FIG. 5.

Similarly, controller 150 can determine that the tailings volume metric is close to the low threshold value and dropping quickly. This is indicated by block 312. It can then take the steps (such as those described with respect to FIG. 4) to inhibit the tailings volume from falling below the low threshold value.

Also, controller 150 may simply determine that the tailings volume metric is below the low threshold value. This may indicate that the controllable mechanisms 154 are to be adjusted, as described above with respect to FIG. 4. This is indicated by block 314.

Controller 150 can determine whether the metric value and rate of change indicate that adjustments should be made to controllable mechanisms 154 in a wide variety of other ways as well. This is indicated by block 316.

Once the determination is made by controller 150, it can then take actions based on that determination, if those actions are needed. Taking such actions is indicated by block 318 in FIG. 5. Controller 150 then illustratively waits for a timeout period, as indicated by block 320, and processing then returns to block 300, where controller 150 again processes the sensor signal(s) from the one or more sensors 133.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

The previous Figures show that various data can be stored locally on machine 102 or remotely (such as in extended system 170). Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein.

Further, the information can be stored on the harvester until the harvester enters a covered location. The harvester, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
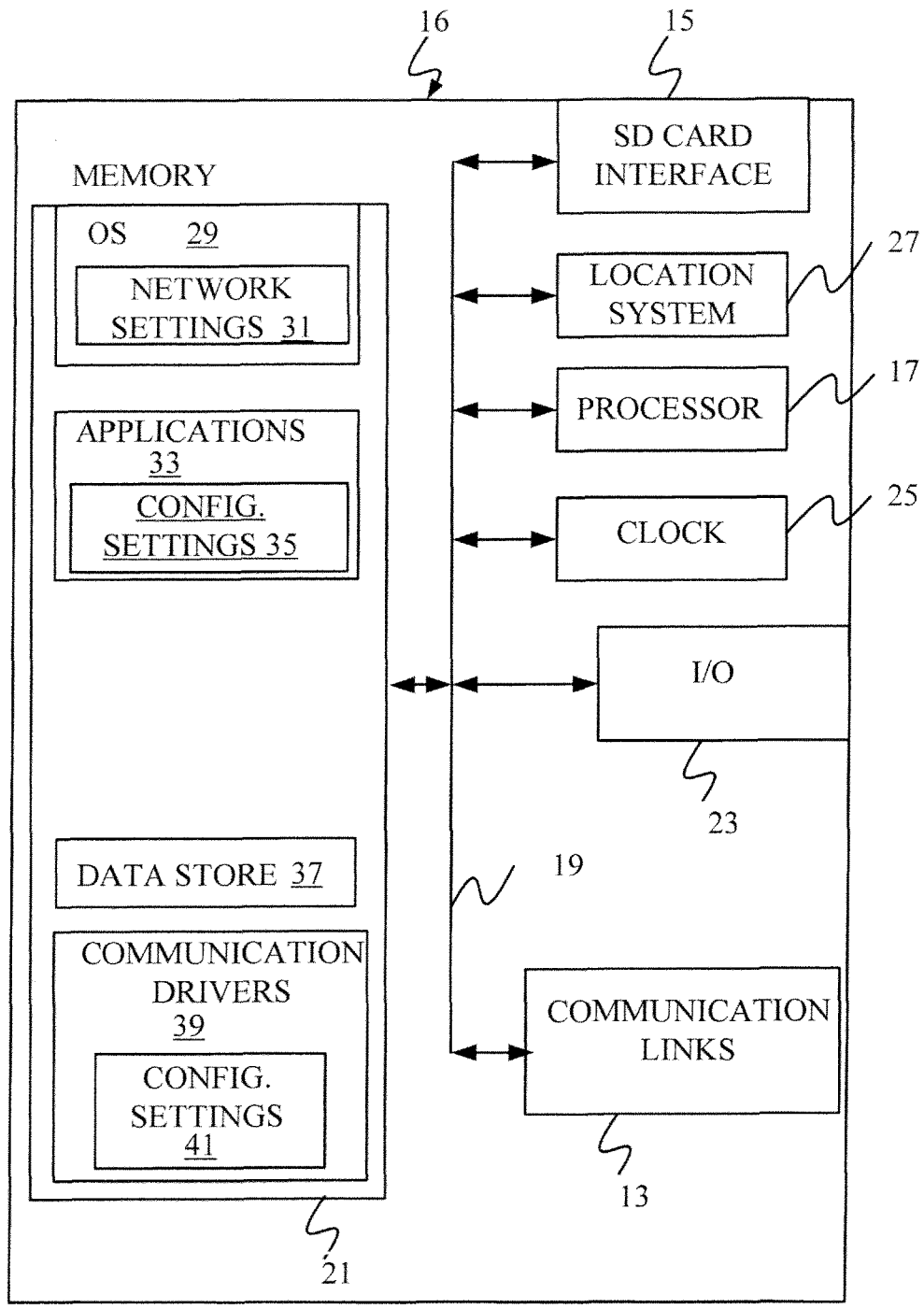
FIGS. 6-8 show examples of mobile devices that can be used in the mobile machine shown in the previous figures.
Figure 7:
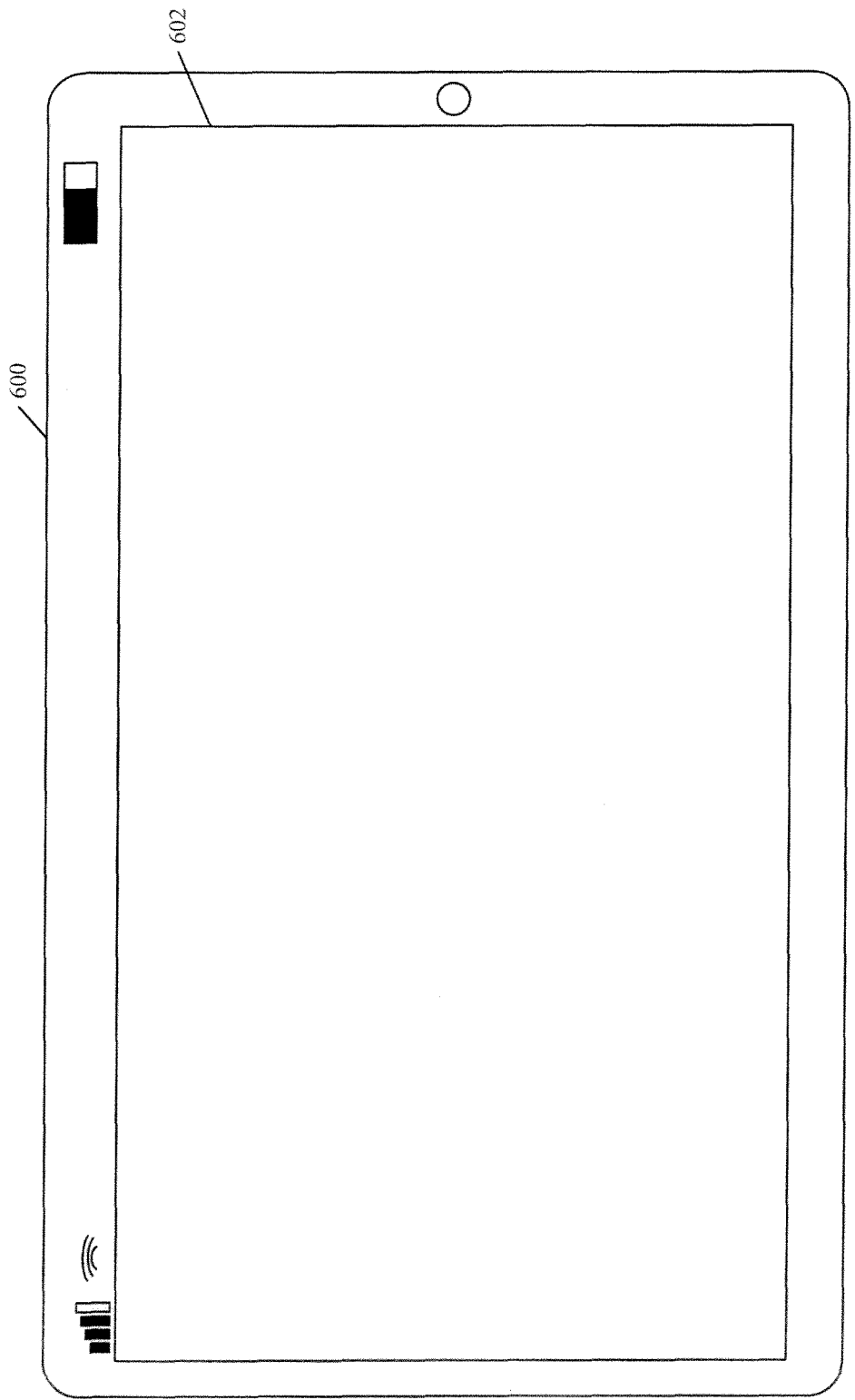
Figure 8:
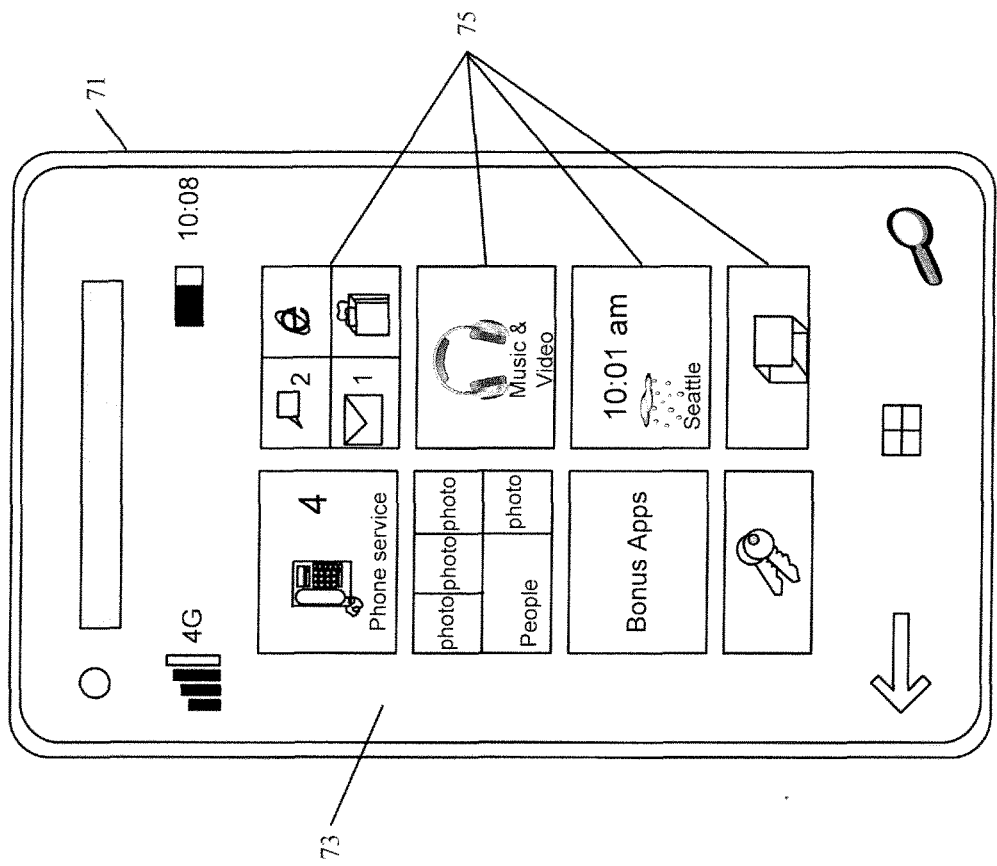

FIG. 6 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the various data (e.g., tailings volume, alert conditions, adjustment verifications, etc.). FIGS. 7-8 are examples of handheld or mobile devices.

FIG. 6 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or sensors from FIG. 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Devices 16 can be a feature phone, smart phone or mobile phone. The phone can include a set of keypads for dialing phone numbers, a display capable of displaying images including application images, icons, web pages, photographs, and video, and control buttons for selecting items shown on the display. The phone includes an antenna for receiving cellular phone signals. In some examples, the phone also includes a Secure Digital (SD) card slot that accepts a SD card.

FIG. 8 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
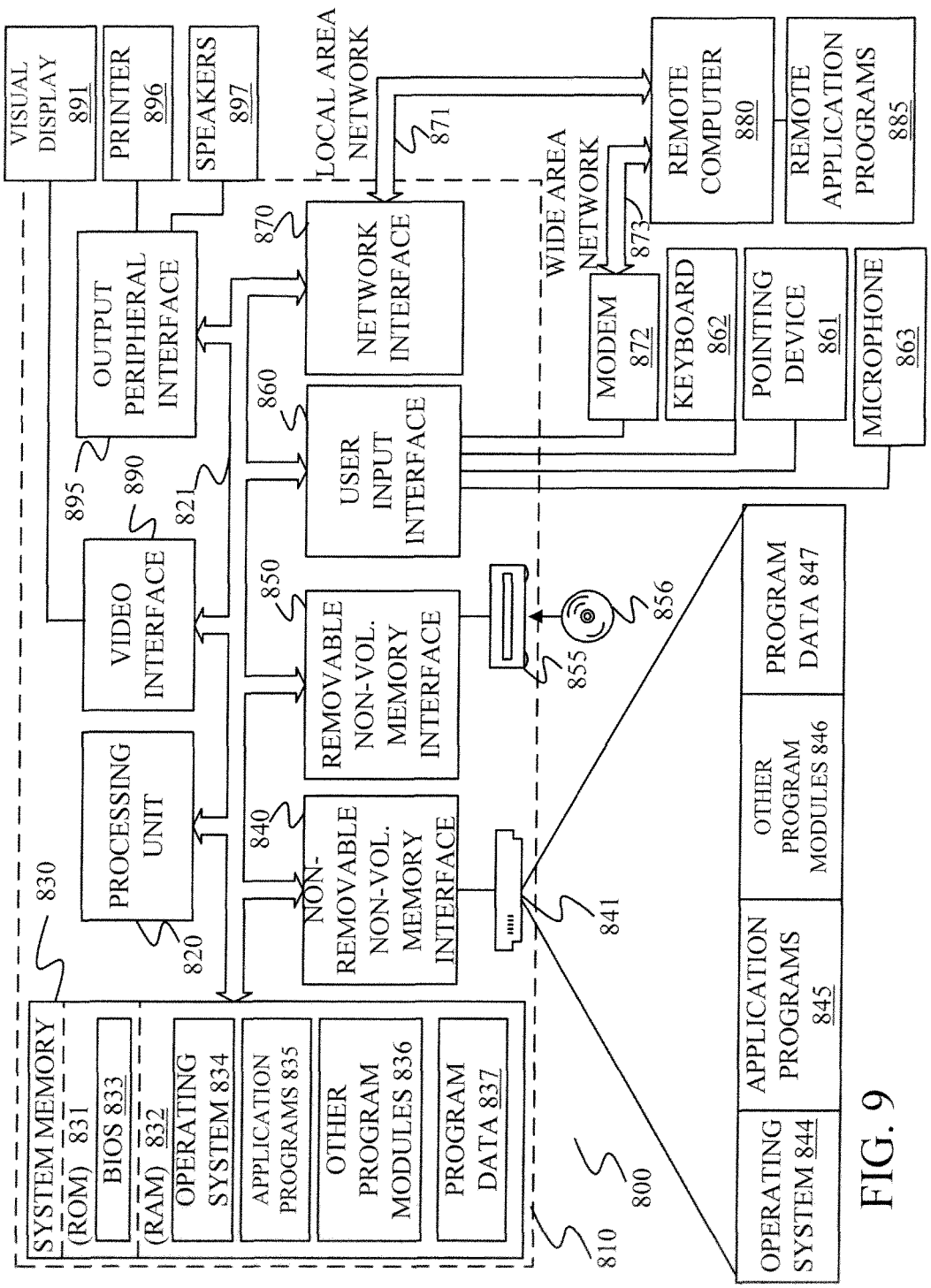
FIG. 9 is a block diagram of one example of a computing environment that can be used in the mobile machine shown in the previous figures.

FIG. 9 is one example of a computing environment in which elements of FIG. 2, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile machine, comprising:
a tailings conveying mechanism that conveys tailings in the mobile machine;
a controllable mechanism that is controllable to modify an amount of tailings in the tailings conveying mechanism;
a sensor sensing a parameter indicative of the amount of tailings in the tailings conveying mechanism and generating a sensor signal indicative of the sensed parameter; and
a controller that receives the sensor signal and controls the controllable mechanism to modify the amount of tailings in the tailings conveying mechanism based on the sensor signal.

Example 2 is the mobile machine of any or all previous examples further comprising a threshing mechanism that threshes processed material and wherein the tailings conveying mechanism comprises:
a tailings elevator that conveys the tailings to the threshing mechanism for re-threshing.

Example 3 is the mobile machine of any or all previous examples wherein the controller generates a tailings volume metric indicative of a tailings volume in the tailings elevator relative to a volume capacity of the tailings elevator, based on the sensor signal, and controls the controllable mechanism based on the tailings volume metric.

Example 4 is the mobile machine of any or all previous examples wherein the controller generates a rate-of-change metric indicative of a rate-of-change of the tailings volume metric and controls the controllable mechanism based on the tailings volume metric and based on the rate-of-change metric.

Example 5 is the mobile machine of any or all previous examples wherein the controllable mechanism comprises:
a sieve that has a controllable sieve clearance, the controller controlling the sieve clearance based on the tailings volume metric.

Example 6 is the mobile machine of any or all previous examples wherein the controllable mechanism comprises:
a chaffer that has a controllable chaffer opening, the controller controlling the chaffer opening based on the tailings volume metric.

Example 7 is the mobile machine of any or all previous examples wherein the controllable mechanism comprises:
a separator fan that has a controllable fan speed, the controller controlling the fan speed based on the tailings volume metric.

Example 8 is the mobile machine of any or all previous examples wherein the sensor comprises:
a plurality of different sensors sensing a plurality of different parameters indicative of the amount of tailings in the tailings elevator.

Example 9 is the mobile machine of any or all previous examples wherein the controllable mechanism comprises:
a plurality of different controllable mechanisms, each controllable to modify the amount of tailings in the tailings elevator.

Example 10 is a method of controlling a mobile machine, comprising:
sensing a parameter indicative of an amount of tailings in a tailings conveying mechanism that conveys tailings in the mobile machine; and
automatically controlling a controllable mechanism to adjust the amount of tailings in the tailings conveying mechanism based on the sensed parameter.

Example 11 is the method of any or all previous examples wherein automatically controlling comprises:
generating a tailings volume metric indicative of a tailings volume in the tailings conveying mechanism, based on the sensed parameter;
comparing the tailings volume metric to a threshold value; and
controlling the controllable mechanism based on the comparison.

Example 12 is the method of any or all previous examples wherein the threshold value comprises a high threshold value and wherein controlling the controllable mechanism comprises;
if the tailings volume metric is above the high threshold value, then controlling the controllable mechanism to reduce the tailings volume in the tailings conveying mechanism.

Example 13 is the method of any or all previous examples wherein controlling the controllable mechanism comprises:
if the tailings volume metric is below, but within a given distance of, the high threshold value, then inhibiting adjustments to the mobile machine that would increase the volume of tailings in the tailings conveying mechanism.

Example 14 is the method of any or all previous examples wherein automatically controlling comprises:
generating a rate-of-change metric indicative of a rate of change of the tailings volume metric; and
controlling the controllable mechanism based on the comparison of the tailings volume metric to the threshold value and based on the rate-of-change metric.

Example 15 is the method of any or all previous examples wherein the threshold value includes a low threshold value and wherein controlling the controllable mechanism comprises:
if the tailings volume metric is below the low threshold value, then controlling the controllable mechanism to increase the tailings volume in the tailings conveying mechanism.

Example 16 is the method of any or all previous examples wherein the controllable mechanism includes at least one of a sieve, a chaffer and a separator fan and wherein automatically controlling the controllable mechanism comprises:
controlling at least one of sieve clearance of the sieve, chaffer clearance of the chaffer and separator fan speed of the separator fan.

Example 17 is a computing system, comprising:
a sensor sensing a parameter indicative of the amount of tailings in a tailings conveying mechanism on a mobile machine and generating a sensor signal indicative of the sensed parameter; and
a controller that receives the sensor signal and controls a controllable mechanism on the mobile machine to modify the amount of tailings in the tailings conveying mechanism based on the sensor signal.

Example 18 is the computing system of any or all previous examples wherein the tailings conveying mechanism comprises a tailings elevator and wherein the controller generates a tailings volume metric indicative of a volume of tailings the tailings elevator and compares the tailings volume metric to a set of threshold values and controls the controllable mechanism based on how the tailings volume metric compares to the set of threshold values.

Example 19 is the computing system of any or all previous examples wherein the controller generates a rate-of-change metric indicative of a rate of change of the tailings volume metric and controls the controllable mechanism based on the rate-of-change metric.

Example 20 is the computing system of any or all previous examples wherein the mobile machine comprises a harvesting machine and wherein the controllable mechanism comprises a sieve, a chaffer and a fan, and wherein the controller controls sieve clearance of the sieve, chaffer clearance of the chaffer and fan speed of the fan based on the sensor signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile machine, comprising:
a tailings conveying mechanism that conveys tailings in the mobile machine;
a controllable mechanism that is controllable to modify an amount of tailings in the tailings conveying mechanism;
a sensor sensing a parameter indicative of the amount of tailings in the tailings conveying mechanism and generating a sensor signal indicative of the sensed parameter; and
a controller that receives the sensor signal, compares it to an upper threshold for the tailings conveying mechanism and a lower threshold for the tailings conveying mechanism, and, if the signal is outside of a range bound by the upper and lower thresholds, automatically generates a control signal for the controllable mechanism to modify control of the controllable mechanism in order to return the amount of tailings in the tailings conveying mechanism to a level within the range.

2. The mobile machine of claim 1 further comprising a threshing mechanism that threshes processed material and wherein the tailings conveying mechanism comprises:
a tailings elevator that conveys the tailings to the threshing mechanism for re-threshing.

3. The mobile machine of claim 2 wherein the controller generates a tailings volume metric indicative of a tailings volume in the tailings elevator relative to a volume capacity of the tailings elevator, based on the sensor signal, wherein the upper threshold is an upper volume threshold and the lower threshold is a lower volume threshold.

4. The mobile machine of claim 3 wherein the controller generates a rate-of-change metric indicative of a rate-of-change of the tailings volume metric and controls the controllable mechanism based on the tailings volume metric and the rate-of-change of the tailings volume metric.

5. The mobile machine of claim 3 wherein the controllable mechanism comprises:

a sieve that has a controllable sieve clearance, the controller controlling the sieve clearance based on the tailings volume metric.

6. The mobile machine of claim 3 wherein the controllable mechanism comprises:
a chaffer that has a controllable chaffer opening, the controller controlling the chaffer opening based on the tailings volume metric.

7. The mobile machine of claim 3 wherein the controllable mechanism comprises:
a separator fan that has a controllable fan speed, the controller controlling the fan speed based on the tailings volume metric.

8. The mobile machine of claim 2 wherein the sensor comprises:
a plurality of different sensors sensing a plurality of different parameters indicative of the amount of tailings in the tailings elevator.

9. The mobile machine of claim 2 wherein the controllable mechanism comprises:
a plurality of different controllable mechanisms, each controllable to modify the amount of tailings in the tailings elevator.

10. A method of controlling a mobile machine, comprising:
sensing a parameter indicative of an amount of tailings in a tailings conveying mechanism that conveys tailings in the mobile machine;
generating a tailings volume metric indicative of a tailings volume in the tailings conveying mechanism, based on the sensed parameter;
comparing the tailings volume metric to an upper amount threshold for the tailings conveying mechanism and to a lower amount threshold for the tailings conveying mechanism;
detecting that the sensed parameter is outside a range defined by the upper amount threshold and the lower amount threshold; and
automatically controlling a controllable mechanism to adjust the amount of tailings in the tailings conveying mechanism based on the tailings volume metric, wherein the adjustment modifies tailings volume to return the amount of tailings to an amount within the range.

11. The method of claim 10 wherein the controllable mechanism includes at least one of a sieve, a chaffer and a separator fan and wherein automatically controlling the controllable mechanism comprises:
controlling at least one of sieve clearance of the sieve, chaffer clearance of the chaffer or separator fan speed of the separator fan.

12. The method of claim 10 wherein controlling the controllable mechanism comprises:
if the tailings volume metric is above the high threshold, then controlling the controllable mechanism to reduce the tailings volume in the tailings conveying mechanism.

13. The method of claim 10 wherein controlling the controllable mechanism comprises:
if the tailings volume metric is below, but within a given offset from, the upper threshold, then inhibiting adjustments to the mobile machine that would increase the volume of tailings in the tailings conveying mechanism.

14. The method of claim 10 wherein automatically controlling comprises:
generating a rate-of-change metric indicative of a rate of change of the tailings volume metric; and
controlling the controllable mechanism based on the comparison of the tailings volume metric to the threshold value and based on the rate-of-change metric.

15. The method of claim 10 wherein controlling the controllable mechanism comprises:
if the tailings volume metric is below the low threshold value, then controlling the controllable mechanism to increase the tailings volume in the tailings conveying mechanism.

16. A computing system, comprising:
a sensor sensing a parameter indicative of the amount of tailings in a tailings conveying mechanism on a mobile machine and generating a sensor signal indicative of the sensed parameter; and
a controller that receives the sensor signal, compares it to an upper amount threshold and a lower amount threshold, and controls a controllable mechanism on the mobile machine to modify the amount of tailings in the tailings conveying mechanism such that the amount of tailings is below the upper amount threshold and above the lower amount threshold.

17. The computing system of claim 16 wherein the tailings conveying mechanism comprises a tailings elevator and wherein the controller generates a tailings volume metric indicative of a volume of tailings the tailings elevator and compares the tailings volume metric to a set of threshold values and controls the controllable mechanism based on how the tailings volume metric compares to the set of threshold values.

18. The computing system of claim 17 wherein the controller generates a rate-of-change metric indicative of a rate of change of the tailings volume metric and controls the controllable mechanism based on the rate-of-change metric.

19. The computing system of claim 16 wherein the mobile machine comprises a harvesting machine and wherein the controllable mechanism comprises a sieve, a chaffer and a fan, and wherein the controller controls sieve clearance of the sieve, chaffer clearance of the chaffer and fan speed of the fan based on the sensor signal.

* * * * *